(12) United States Patent  (10) Patent No.: US 8,025,145 B2
Keys  (45) Date of Patent: Sep. 27, 2011

(54) CONVEYOR IDLER ROLLER

(75) Inventor: Shane Keys, Callaghan (AU)

(73) Assignee: Newcastle Innovation Limited, Callaghan, New South Wales (AU)

( * ) Notice: Subject to any disclaimer, the term of this patent is extended or adjusted under 35 U.S.C. 154(b) by 0 days.

(21) Appl. No.: 12/444,561

(22) PCT Filed: Oct. 5, 2007

(86) PCT No.: PCT/AU2007/001514
§ 371 (c)(1),
(2), (4) Date: Apr. 6, 2009

(87) PCT Pub. No.: WO2008/040093
PCT Pub. Date: Apr. 10, 2008

(65) Prior Publication Data
US 2010/0038214 A1  Feb. 18, 2010

(30) Foreign Application Priority Data
Oct. 6, 2006 (AU) .............................. 2006905573

(51) Int. Cl.
*B65G 15/08* (2006.01)
(52) U.S. Cl. .................... 198/825; 198/823; 198/824
(58) Field of Classification Search ............ 198/823–830
See application file for complete search history.

(56) References Cited

U.S. PATENT DOCUMENTS

| | | | | | |
|---|---|---|---|---|---|
| 1,980,777 | A | * | 11/1934 | Zollinger | 198/829 |
| 2,592,831 | A | * | 4/1952 | Spurgeon et al. | 198/825 |
| 2,766,076 | A | * | 10/1956 | Saxe | 198/825 |
| 2,947,409 | A | * | 8/1960 | Dodge, Jr. et al. | 198/824 |
| 3,334,727 | A | * | 8/1967 | Rieser | 198/829 |
| 3,338,381 | A | * | 8/1967 | Imse | 198/825 |
| 3,362,525 | A | * | 1/1968 | Fehr | 198/497 |
| 4,606,659 | A |   | 8/1986 | Hogan | |
| 4,730,723 | A | * | 3/1988 | Mossot | 198/827 |
| 4,830,179 | A | * | 5/1989 | Fyfe | 198/825 |
| 4,844,241 | A | * | 7/1989 | Woodward | 198/821 |
| 4,919,253 | A | * | 4/1990 | Morrison | 198/830 |
| 6,044,965 | A |   | 4/2000 | Clark | |

FOREIGN PATENT DOCUMENTS

| | | |
|---|---|---|
| AU | 1998078774 B2 | 2/1999 |
| GB | 989274 A | 4/1965 |
| GB | 1494960 A | 12/1977 |
| GB | 2039261 A | 8/1980 |

* cited by examiner

*Primary Examiner* — James R Bidwell
(74) *Attorney, Agent, or Firm* — Harness, Dickey & Pierce, P.L.C.

(57) ABSTRACT

An idler roller (4, 5, 6) for supporting an endless belt (2) in a roller conveyor (1) that includes a frame (7) for mounting the idler roller (4, 5, 6) to the conveyor (1), a support shaft (8) mountable to the frame (7) for supporting the idler roller (4, 5, 6) and a roller casing (9) rotatably mountable to the shaft (8) by a bearing assembly (10). The bearing assembly is substantially enclosed within the roller casing. The idler roller (4, 5, 6) is cantilevered to the conveyor (1) such that the bending moment of a load exerted on the roller casing (9) is displaced onto the bearing assembly (10).

21 Claims, 8 Drawing Sheets

CONVEYOR IDLER ROLLER

CROSS REFERENCE TO RELATED APPLICATIONS

This application is a 371 U.S. National Stage of International Application No. PCT/AU2007/001514, filed Oct. 5, 2007, which claims the benefit of Australian Application No. 2006905573, filed Oct. 6, 2006. The disclosures of the above applications are incorporated herein by reference.

FIELD OF THE INVENTION

This present invention relates to an idler roller for supporting an endless belt in a roller conveyor and, in particular, an idler roller for supporting an endless belt in an open roller conveyor for transporting bulk particulate material.

The invention has been developed primarily for use in a roller conveyor for transporting bulk particulate material, such as coal, and will be described hereinafter with reference to this application. However, it will be appreciated that the invention is not limited this particular field of use. It is contemplated that this invention is also applicable to the transportation of other bulk particulate material including wheat, powder, and other granular materials.

BACKGROUND OF THE INVENTION

Any discussion of the prior art throughout the specification should in no way be considered as an admission that such prior art is widely known or forms part of the common general knowledge in the field.

Roller conveyors are universally used for transporting bulk solids, especially bulk particulate material, such as minerals, including coal. Generally, roller conveyors include an endless belt mounted on a series of idler rollers. The endless belt is driven over the idler rollers in operation, the idler rollers supporting the endless belt as well as the bulk solids.

In general, the idler roller includes a roller casing, an internal shaft and a set of bearings for allowing the casing to rotate about the internal shaft. The internal shaft typically extends the full length, or longer than, the length of the idler roller casing. The bearings are provided, in general, close to either end of the roller casing in a two point support configuration. Most idler rollers in service are of this two point support type, called a through-shaft type idler roller.

A disadvantage of this through-shaft type of idler roller is the excess mass of the unit, due to wasted material being needed for the long static shaft. To reduce weight, the shaft and bearings are kept small. However, this leads to significant bending loads being imposed on the shaft and therefore requires bearings to have substantial tolerance for angular error. This in turn compromises the expected life of the bearings and increases the frequency of service and maintenance of each idler roller. This angular displacement also leads to the use of labyrinth seals over lip seals, resulting in a more complex unit.

Another disadvantage is that during operation of the conveyor a considerable amount of dust, moisture and other contaminants is deposited by the bulk solid, around the idler rollers, leading to the ingress of these contaminants past the dust and labyrinth seal into the upper bearing and casing below. This causes increased idler roller drive torque, idler roller failure and even belt damage.

Finally, removal of the through-shaft type from an assembled roller conveyor can be problematic, where the conveyor belt has to be substantially raised in order to lift the shaft ends of the idler roller from their respective support slots in the idler roller frame. This increases the risk of injury during removal, maintenance and replacement of the idler rollers.

SUMMARY OF THE INVENTION

According to one aspect of the invention, there is provided an idler roller for supporting an endless belt in a roller conveyor, said idler roller including:
  a frame for mounting the idler roller to the conveyor;
  a support shaft mountable to the frame for supporting the idler roller; and
  a roller casing rotatably mountable to the shaft by a bearing assembly, the bearing assembly being substantially enclosed within the roller casing,
  wherein the idler roller is cantilevered to the conveyor such that the bearing assembly is able to be designed to be positioned within the roller casing so that the load from a material on the conveyor corresponds to the approximate position of the bearing assembly, minimising the bending moment from the load on the bearing assembly.

Another aspect of the invention provides a roller conveyor, the roller conveyor including:
  an endless belt for transporting a bulk material; and
  a plurality of idler rollers for supporting the endless belt,
  wherein one or more of the idler rollers is an idler roller according to the first aspect of the invention.

By arranging the idler roller with a configuration that diverts the bending moment onto the bearing assembly, the bearings are able to directly take the load placed upon the roller casing by the bulk solid transported by the endless belt. This minimises the bending forces exerted on the support shaft, thereby reducing the need for the bearings to have a tolerance for angular error, enabling reduction in the weight of the roller and thus increasing the expected life of the idler roller. Furthermore, the cantilevered arrangement of the idler roller is easily accessible, enabling a convenient and safer means for removing the idler roller for service and replacement.

Preferably, the roller casing has a distal end and a proximal end, the roller casing being removably mountable to the shaft without access to the bearing assembly from said distal end.

Preferably, the idler roller includes a joint for cantilevering the support shaft to the frame. Preferably, the bending moment is displaced by the joint onto the bearings assembly. Preferably, the joint is defined by mutually engaging joining parts of the support shaft and the frame. Preferably, the mutually engaging joining parts have complementary shapes for mutual engagement. Preferably, one mutually engaging joining part includes a tapered bore and the other mutually engaging joining part includes a tapered head. Preferably, the tapered bore and tapered head are frusto-conical in shape.

Preferably the tapered bore defines an included angle between 10° and 30°. Preferably, the included angle is around 20°.

In one embodiment, the tapered bore is formed at one end of the support shaft and the tapered head is formed on the frame. Preferably, the tapered bore is in the form of a blind bore. Preferably, the blind bore includes a recessed portion for receiving a fastener. Preferably, the tapered head is in the form of a collar for receiving the fastener therethrough and at least partial nestable engagement in the tapered bore. Preferably, the fastener is a bolt or screw threaded fastener.

In another embodiment, the tapered bore is formed in the frame and the tapered head is formed on the support shaft. Preferably, the tapered head includes a projecting plug for fastening the tapered head to the tapered bore. Preferably, the projecting plug includes a screw thread and the recessed portion of the tapered bore includes a corresponding mating thread.

Preferably, the bearing assembly is removably mounted within the roller casing.

Preferably, the bearing assembly includes a bearing housing, and at least two bearings within the bearing housing for engagement with the support shaft. Preferably, the bearings are pre-loaded. Preferably, the bearing assembly includes a pair of ball or roller bearings. Preferably, the bearings directly support the load. Preferably, the bearing housing includes internal recesses for receiving the bearings.

Preferably, the bearing assembly and the support shaft are located towards the proximal end of the roller casing. Preferably, an end of the bearing housing adjacent the support shaft includes a seal for inhibiting the ingress of contaminants. Preferably, the idler roller is cantilevered to lie substantially in the horizontal plane of the roller conveyor, or at an angle thereto, so as to minimise exposure of the seal to contaminants. Preferably, the bearing housing end adjacent the support shaft faces either horizontally or downwardly relative to the roller conveyor. Preferably, the seal is a lip seal or labyrinth seal.

Preferably, the roller casing is permanently sealed at an opposite end to the bearing assembly and support shaft. Preferably, the bearing assembly includes a cap for sealing the bearing housing at one end. Preferably, the idler roller is configured as a troughing, centre or return idler roller.

In the second aspect of the invention, it is preferable that the plurality of idler rollers includes troughing idler rollers for supporting lateral edge portions of the endless belt. Preferably, the plurality of idler rollers includes centre idler rollers for supporting a central longitudinal portion of the endless belt. Preferably, the plurality of idler rollers includes return idler rollers for supporting an unloaded portion of the endless belt. Preferably, the plurality of idler rollers includes any combination of the troughing, centre and return idler rollers.

Where the idler roller is a troughing idler roller, preferably the idler roller is cantilevered at an angle of between 20° and 45° with respect to the horizontal plane of the conveyor. Preferably, where the idler roller is a centre idler roller, the idler roller is cantilevered at an angle of between 0° and 22.5° with respect to the horizontal plane of the conveyor.

By arranging the idler roller, in a troughing, wing or centre configurations, the seal and support shaft point downwards or sideways relative to the horizontal plane of the conveyor, away from any moisture or dust which may be deposited from the bulk material being transported by the conveyor. Thus, dust and moisture tends to be excluded from entering the interior of the roller casing and thus contaminating the bearing assembly.

BRIEF DESCRIPTION OF THE DRAWINGS

Preferred embodiments of the invention will now be described, by way of example only, with reference to the accompanying drawings, in which:

FIG. 2b is an exploded view of the joint in FIG. 2a;

FIG. 3b is an exploded view of the joint in FIG. 3a;

FIG. 6b is an exploded view of the joint in FIG. 6a;

PREFERRED EMBODIMENT OF THE INVENTION

Figure 1:
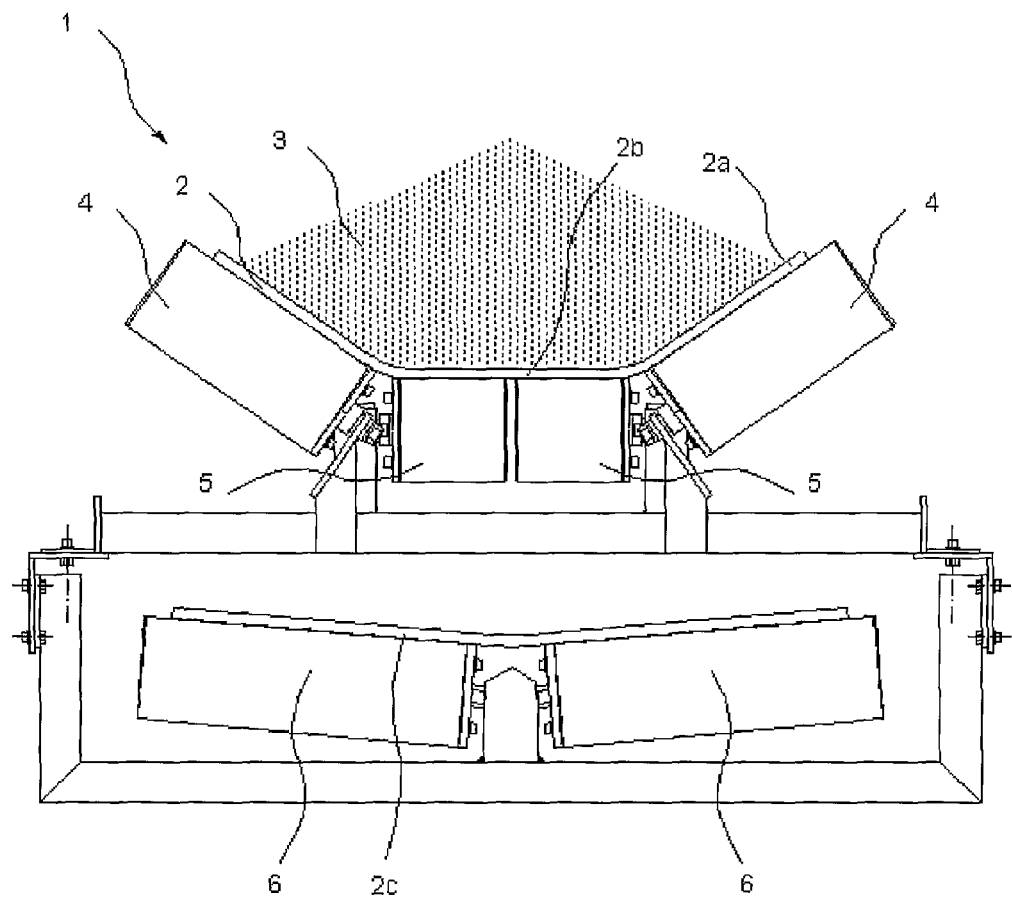
FIG. 1 is a front view of a roller conveyor with troughing, centre and return idler rollers in accordance with embodiments of the invention.

In the preferred embodiments of the invention, the idler roller according to the invention has been embodied in three types of idler rollers. The first type is a troughing or wing idler roller used to support the lateral edge portions of a loaded belt carrying a bulk solid. The second type is a centre idler roller, typically deployed in pairs, used to support the central longitudinal portion of a loaded belt carrying a bulk solid. The third type is a return idler roller, in a 5° V-pair configuration, used to support the unloaded return belt of a roller conveyor. It will be recognised by one skilled in the art that the invention may be implemented as any one of these three types of idler rollers, or any combination thereof Referring to FIG. 1, one embodiment of the invention provides a roller conveyor 1, including an endless belt 2 for transporting a bulk material 3 and a plurality of idler rollers 4, 5 and 6. The idler rollers 4 are in the form of a troughing or wing idler roller used to support the lateral edge portions 2a of the loaded endless belt 2. The idler rollers 5 are centre idler rollers used to support a central longitudinal portion 2b of the loaded belt 2. The idler rollers 6 are return idler rollers, in a 5° V-pair configuration, for supporting an unloaded portion 2c of the endless belt 2.

Figure 2A:
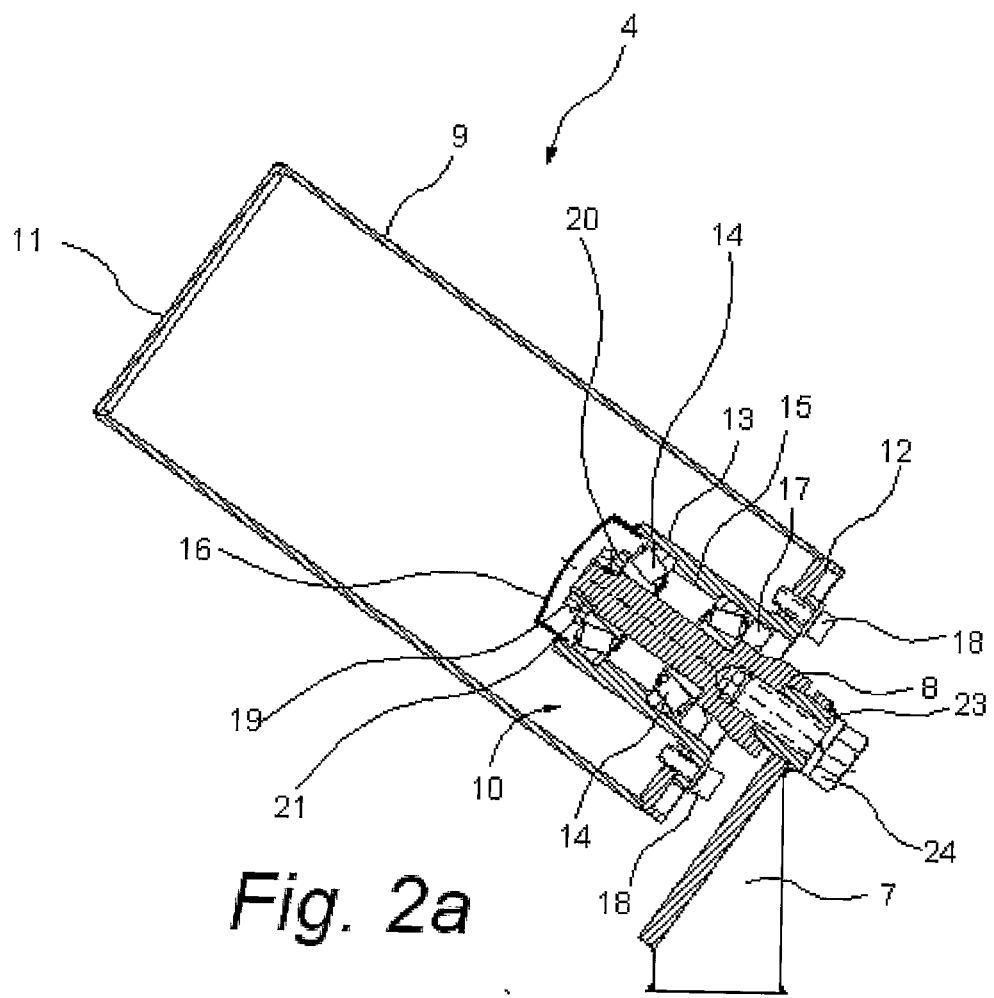
FIG. 2a is a sectional view along the longitudinal plane of a troughing idler roller according to one embodiment of the invention.
Figure 2B:
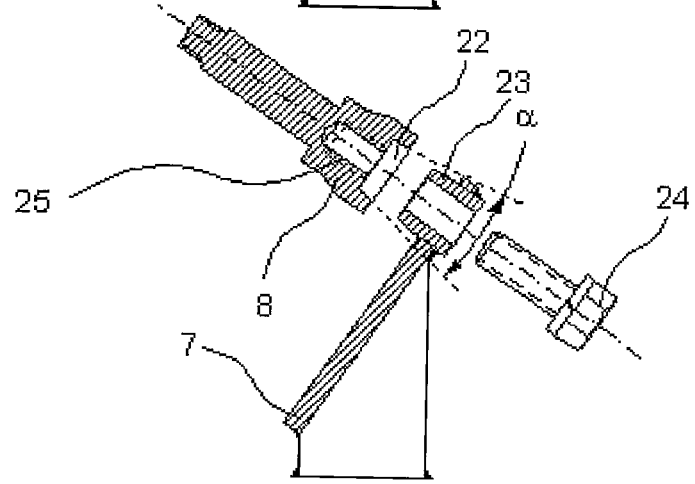

Referring to FIGS. 2a and 2b, a troughing idler roller 4 is shown in greater detail. The idler roller 4 includes a frame 7 for mounting the idler roller 4 to the conveyor 1, a static stub support shaft 8 mountable to the frame 7 for supporting the idler roller 4 and a cylindrical outer roller casing 9 rotatably mountable to the stub shaft 8 by a bearing assembly 10, the bearing assembly 10 being substantially enclosed within the cylindrical roller casing 9, wherein the idler roller 4 is cantilevered to the conveyor I such that the bending moment of a load exerted on the roller casing 9 is displaced onto the bearing assembly 10.

The cylindrical outer roller casing 9 is permanently closed at one end by a welded cap 11 and is fitted with a mounting flange 12 at its other end. The bearing assembly 10 includes a flanged bearing housing 13 and two preloaded bearings 14 arranged as a pair on an internal shoulder 15 of the housing 13. A grease cap 16 seals one end of the bearing housing 13 and a single lip seal 17 is provided at the opposite end of the bearing housing 13. The cap 16 and the lip seal 17 retain the lubricating grease within the bearing housing 13 in cooperation with the stub shaft 8, and protect the bearing assembly from the ingress of contaminants, such as dust and moisture from the bulk particulate material being transported by the conveyor 1. The bearing housing 13 is coupled to the roller casing 9 at their respective mounting flanges by a set of set screws 18.

The static stub shaft 8 is coupled to the preloaded bearings 14 by a preloading locknut 19, lock washer 20 and spacer 21 to enable rotation of the roller casing 9 about the stub shaft 8.

Referring to FIG. 2b, the stub shaft 8 and the idler frame 7 define a joint for cantilevered mounting of the idler roller 4 to the conveyor 1, by way of mutually engaging joining parts in the form of a tapered blind bore 22 at one end of the stub shaft 8 and a complementary shaped tapered head defined by a collar 23. A shaft location screw 24 is inserted through the collar 23 and into a recessed portion 25 of the bore 22 to securely fix the joint.

The tapered bore 22 defines an included taper angle α of 20°, although included taper angles α of 10° to 30° can also be used. The included angle α of the tapered bore provides increased space around the joint, permitting easier access to the bearing assembly without weakening the joint so that it has sufficient strength to retain the bearing assembly and idler roller casing in position. This easier access advantageously improves the safety in replacement and repair of the idler rollers in the roller conveyor.

Figure 3A:
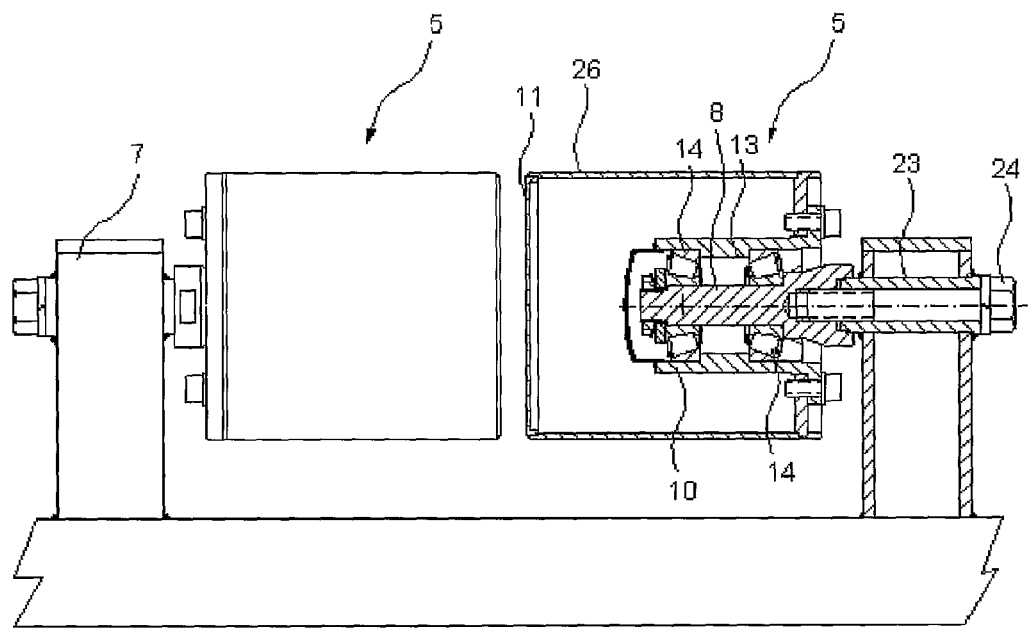
FIG. 3a is a sectional view along the longitudinal plane of a centre idler roller according to a further embodiment of the invention.
Figure 3B:
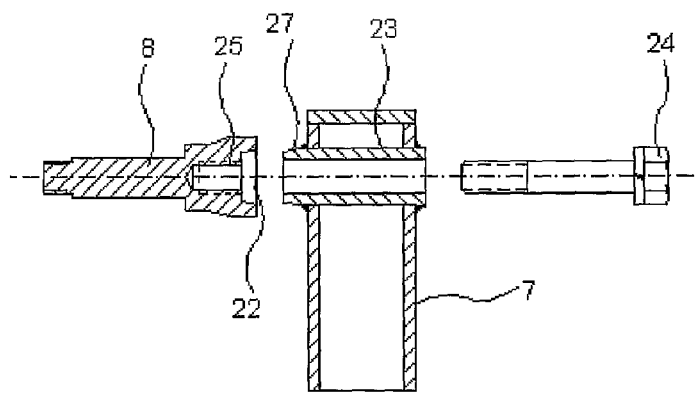

Referring now to FIGS. 3a and 3b, another embodiment of the invention provides a centre idler roller 5, where corresponding features have been given the same reference numerals. The centre idler roller 5 includes a frame 7 for mounting the idler roller 5 to the conveyor, a static stub support shaft 8 mountable to the frame 7 for supporting the idler roller 5 and a short cylindrical outer roller casing 26 mountable to the stub shaft 8 by a bearing assembly 10, the bearing assembly 10 being substantially enclosed within the outer roller casing 26. The idler roller 5 is cantilevered to the conveyor 1 (via the idler frame 7) such that the bending moment of a load exerted on the roller casing 26 is displaced onto the bearing assembly 10.

The main difference between this embodiment of the invention and the previous embodiment, aside from their differing functions as a centre idler roller and troughing idler roller, respectively, lies in the configuration of the joint defined by the stub shaft 8 and the frame 7. In this embodiment, the collar 23 is substantially cylindrical along most of its length and is permanently welded to the frame 7. The collar 23 includes a tapered head portion 27 for nestable engagement with the corresponding tapered bore 22 of the stub shaft 8, which defines an included taper angle α of around 20°, although included taper angles α of 10° to 30° can also be used. A long shaft location screw 24 engages a recessed portion 25 of the tapered bore 22 having a cooperating internal mating thread to securely fix the joint formed by the tapered bore 22 and the collar 23.

Figure 4A:
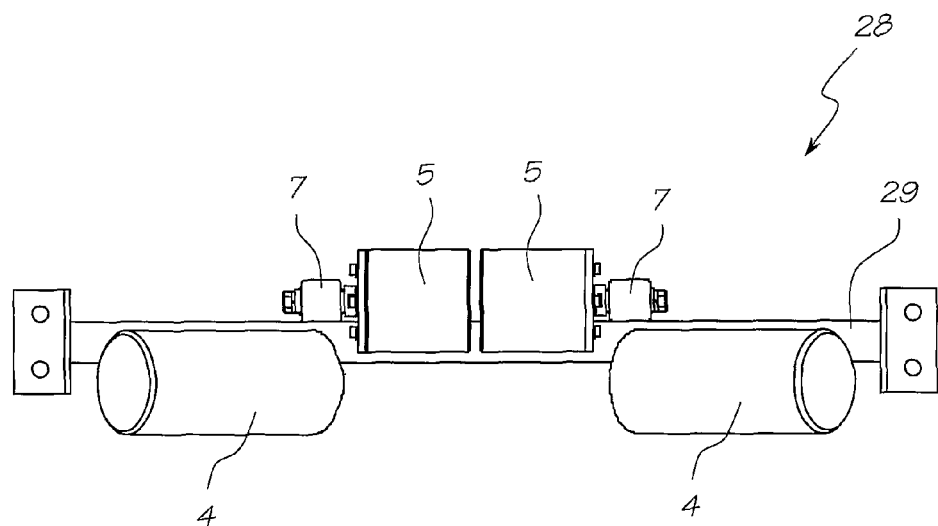
FIGS. 4a and 4b are top and front views, respectively, of a load idler roller set according to a further embodiment of the invention.
Figure 4B:
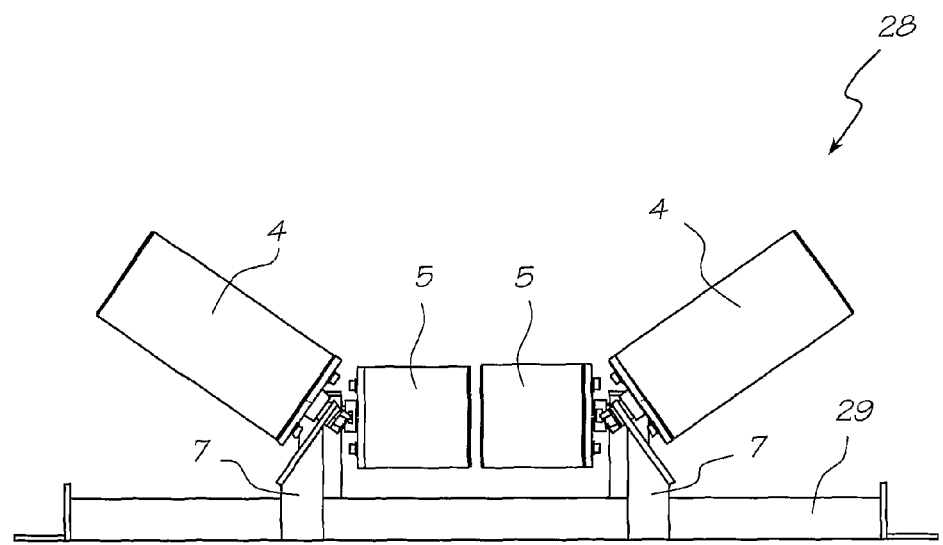

Referring to FIGS. 4a and 4b, a load idler set 28 incorporates a pair of the troughing idler rollers 4 of FIGS. 2a and 2b and a pair of centre idler rollers 5 of FIGS. 3a and 3b. The troughing idler rollers 4 and the centre idler roller 5 are mounted on the same base frame 29, as best shown in FIG. 4b. This allows for ease of installation of the load idler set 28 for retrofitting onto existing belt conveyors.

The centre idler roller 5 operates in a substantially similar manner to the troughing idler roller 4.

Figure 5:
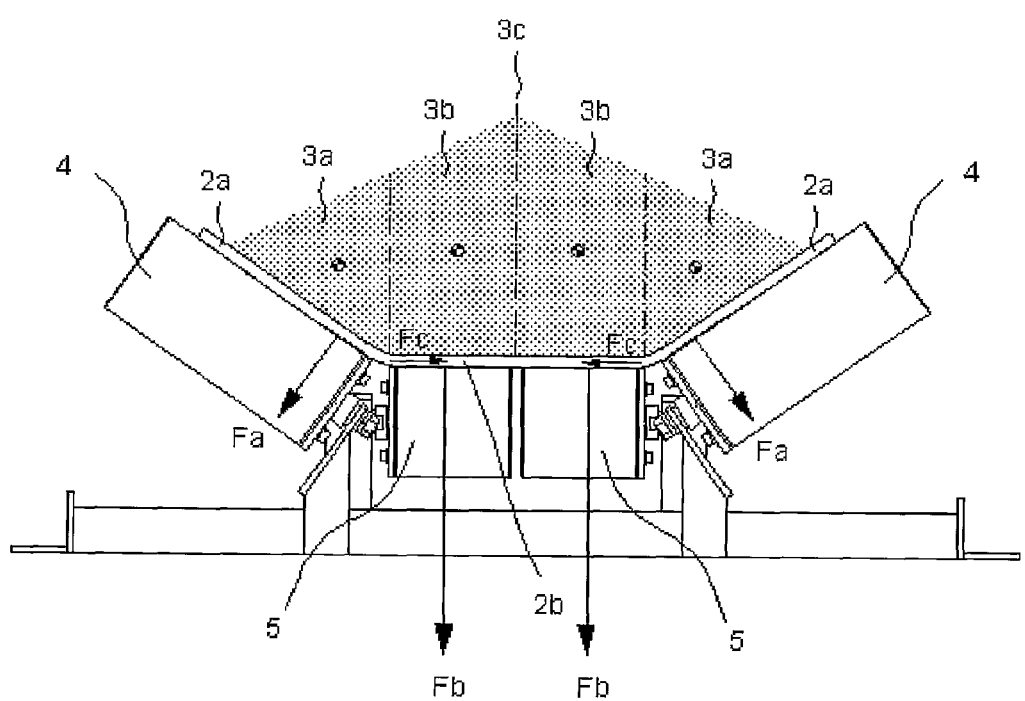
FIG. 5 is a schematic drawing illustrating the typical reaction forces applied to the idler rollers by a loaded endless belt in a roller conveyor.

FIG. 5 shows the reaction forces that are produced by a typical load of bulk particulate material transported upon the endless belt 2 by the conveyor 1. Assuming an even distribution of the bulk material 3 on the endless belt 2, the bulk material 3 can be approximately divided into four cross-sectional areas 3a, 3b that are symmetrical around a central longitudinal axis 3c. The sections 3a each have a cross-sectional area of about one-sixth of the approximate total cross-sectional area of the bulk material 3, while the sections 3b each have a cross-sectional area of about one-third of the approximate total cross-sectional area of the bulk material 3. The reaction forces caused by each of the sections 3a, 3b are shown by arrows Fa, Fb and Fc. These reaction forces acting between the belt 2 and the idler rollers 4 and 5 produce respective bending moments around the support joints defined by the idler frame 7 and the stub shafts 8. As can be seen in FIG. 5, the troughing idler roller 4 and centre idler rollers 5 displace the forces Fa and Fb (and hence the bending moments) so that they correspond to the approximate positions of the bearing assemblies 10 and their preloaded paired bearings 14. The conveyor belt section 2b is loaded transversely by the two forces Fc.

In operation, as the endless belt 2 is driven over the idler rollers, including the troughing idler rollers 4 and centre idler rollers 5, the reaction forces Fa and Fb (and thus their respective bending moments) exerted on the respective idler roller casings 9 and 26 are transferred though the action of the cantilevered joints so as to be directed onto the bearing assemblies 10 and the bearings 14, as shown in FIG. 5. This results in a minimal amount of force being applied along the length of the stub shafts 8, thereby reducing the amount of angular deflection of the shaft 8 and thus obviates the need for the bearings 14 to have the necessary tolerance for angular error that is required in conventional idler rollers. This means that the weight of the idler roller units can be significantly reduced.

In addition, the mounting of the idler rollers 4 and 5 are such that the idler rollers 4 and 5 are each cantilevered to lie substantially in the horizontal plane of the roller conveyor 1, or at an angle thereto, so as to minimise exposure of the seal to contaminants. That is, the bearing housing end adjacent the support shaft faces either horizontally or downwardly relative to the roller conveyor 1 so that the lip seals 17 face either downwardly (in the case of the troughing idler rollers 4) or sideways (in the case of the centre idler rollers 5), thus minimising their exposure to dust and moisture during operation of the roller conveyor 1. This is particularly advantageous where the roller conveyor is an open roller conveyor. Consequently, the idler rollers 4 and 5 require less servicing and maintenance, and thus have an increased life expectancy.

The tapered joint permits convenient removal of the idler rollers for maintenance and service, as the included taper angle provides a wider angle for access to the mounting of the idler rollers 4 and 5. Furthermore, removal of the idler rollers 4 and 5 is much safer compared to the conventional through-shaft type idler rollers, since the idler rollers 4 and 5 can be simply removed from their respective frames 7 at one end without needing to also move the other components of the conveyor 1, such as the belt 2.

Figure 6A:
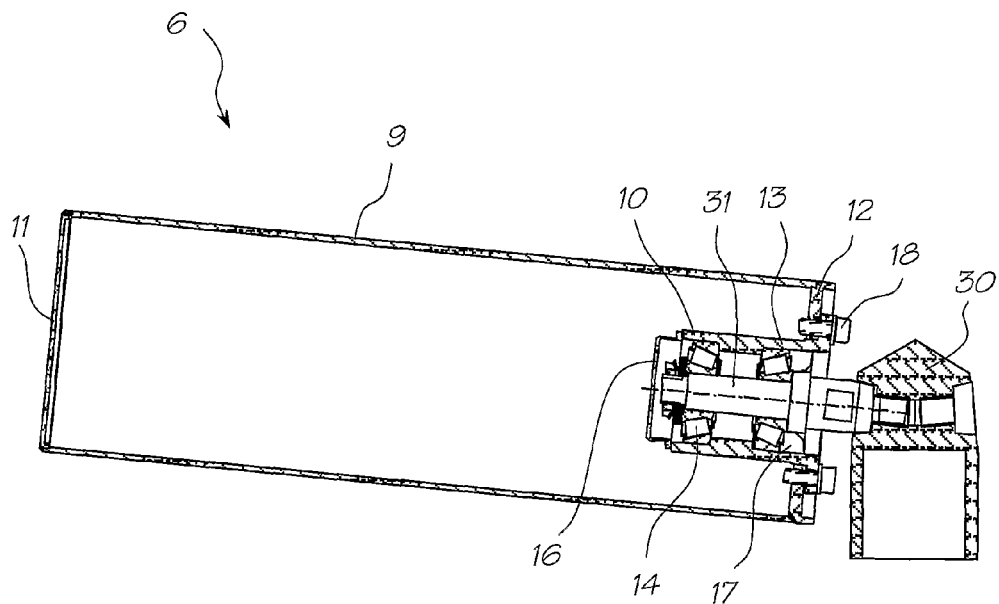
FIG. 6a is a sectional view along the longitudinal plane of a return idler roller according to another embodiment of the invention.
Figure 6B:
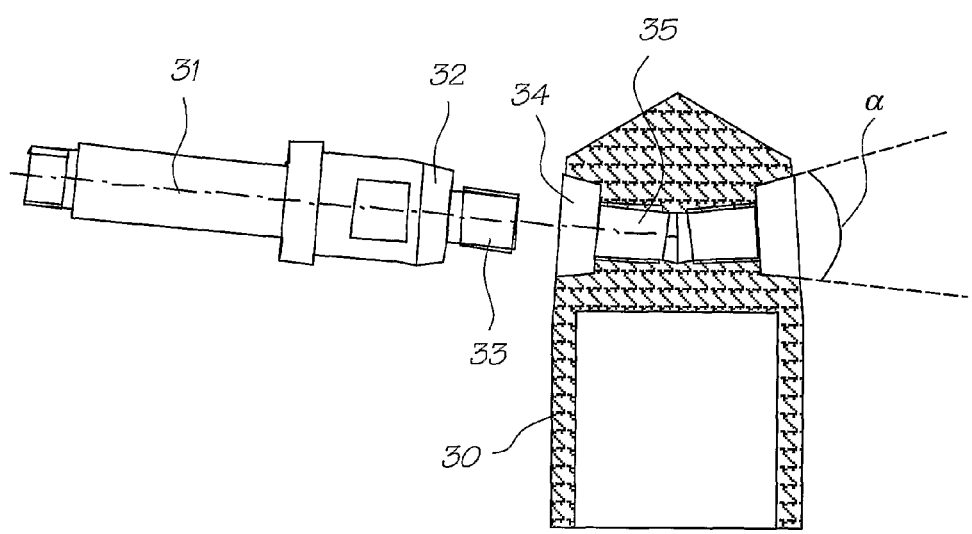

Referring to FIGS. 6a and 6b, another embodiment of the invention provides a return idler roller 6 for supporting an endless belt in a roller conveyor, where corresponding features have been given the same reference numerals. The idler roller 6 includes a frame 30 for mounting the idler roller 6 to the conveyor 1, a static stub support shaft 31 mountable to the frame 30 for supporting the idler roller 6 and a cylindrical outer roller casing 9 rotatably mountable to the stub shaft 31 by a bearing assembly 10, the bearing assembly 10 being substantially enclosed within the cylindrical roller casing 9. The idler roller 6 is cantilevered to the conveyor 1 such that the bending moment of a load exerted on the roller casing 9 is displaced onto the bearing assembly 10.

The main difference between this embodiment and the previous embodiments, other than their respective functions as a return idler roller, a troughing idler roller and a centre idler roller, respectively, is in the configuration of the joint defined by the static stub shaft 31 and the frame 30. In particular, the stub shaft 31 includes a tapered head 32 with a projecting plug portion 33, whereas the frame 30 has a complementary shaped tapered bore 34 and a recessed end portion 35. The tapered bore 34 of the frame 30 defines an included taper angle α of 20°. The plug portion 33 has an external male thread and the recessed portion 35 has an internal mating female thread, so that the plug portion 33 acts in the same way as the fastener 24 in the previous embodiments to securely fix the joint. In this configuration, the roller casing 9, with bearing assembly 10, is simply screwed into the frame 30 for mounting by way of the stub shaft 31.

Figure 7:
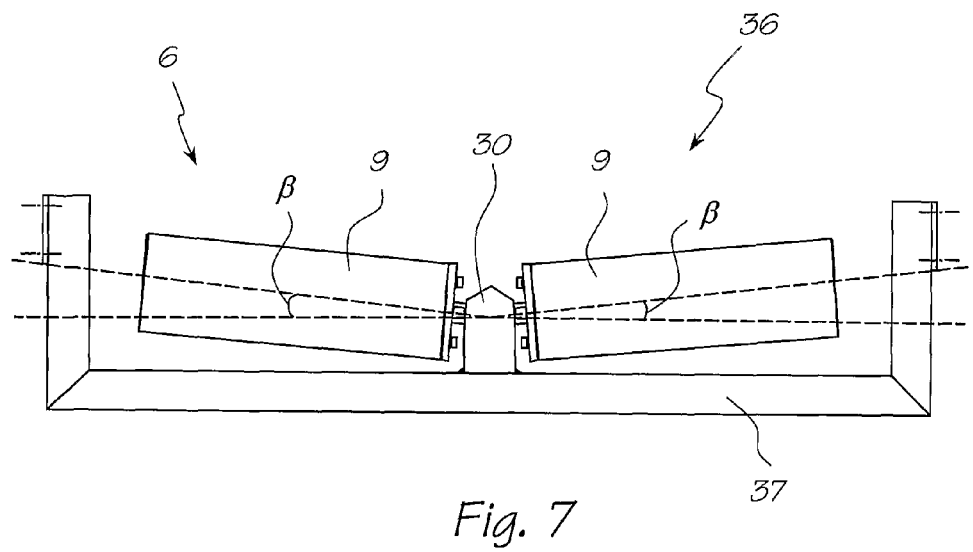
FIG. 7 is a front view of a return idler roller set using two return idler rollers of FIGS. 6a and 6b.

This joint configuration is essentially the reverse of the joint configuration illustrated in FIGS. 2a, 2b, 3a and 3b, and confers the advantage of simplifying the connection of the roller casing 9 to the frame 30, reducing the number of components for assembly of the return idler roller 6. Furthermore, the return idler roller 6 can be configured such that two roller casings 9, with their associated bearing assemblies 10, can be mounted onto one frame 30, as best shown in FIG. 7. The return idler set 36 includes a pair of return idler rollers 6 mounted through a common idler frame 30 to a base frame 37 in a V-pair configuration at approximately 5° with respect to the horizontal plane of the roller conveyor, as indicated by angle β.

The return idler roller 6 operates in a similar way as the troughing and centre idler rollers 4 and 5, although it does not need to bear a loaded belt. The return idler roller 6 has the same advantages of resistance to bearing damage and contamination, reduced mass and increased service life. It is also easily and safely removable from the conveyor for servicing, maintenance and replacement.

Figure 9:
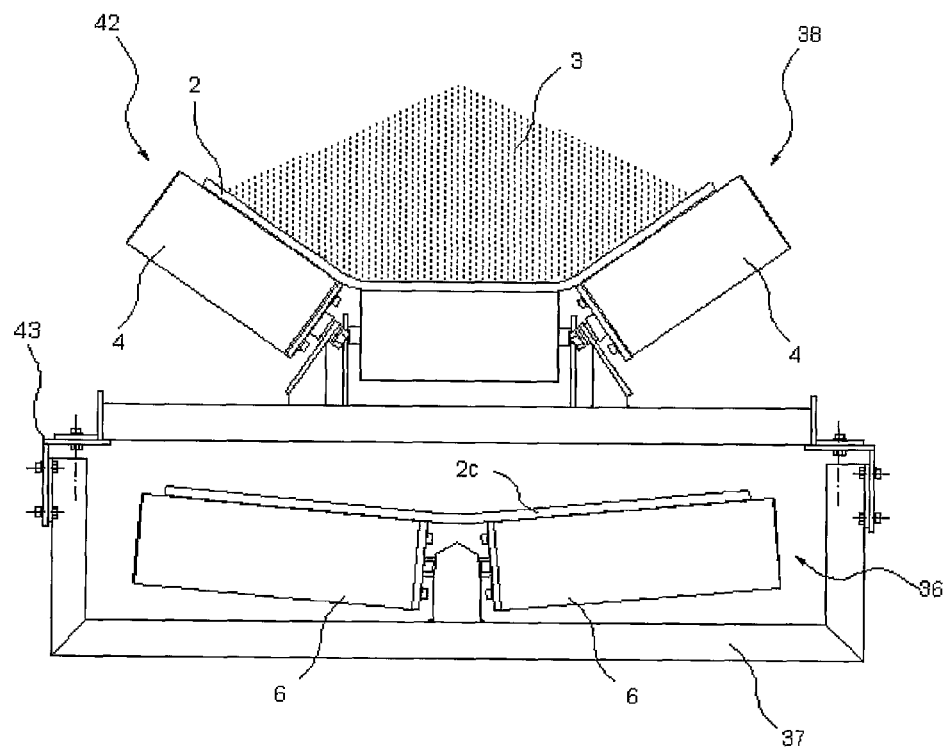
FIG. 9 is a front view of a roller conveyor according to a further embodiment of the invention.
Figure 8A:
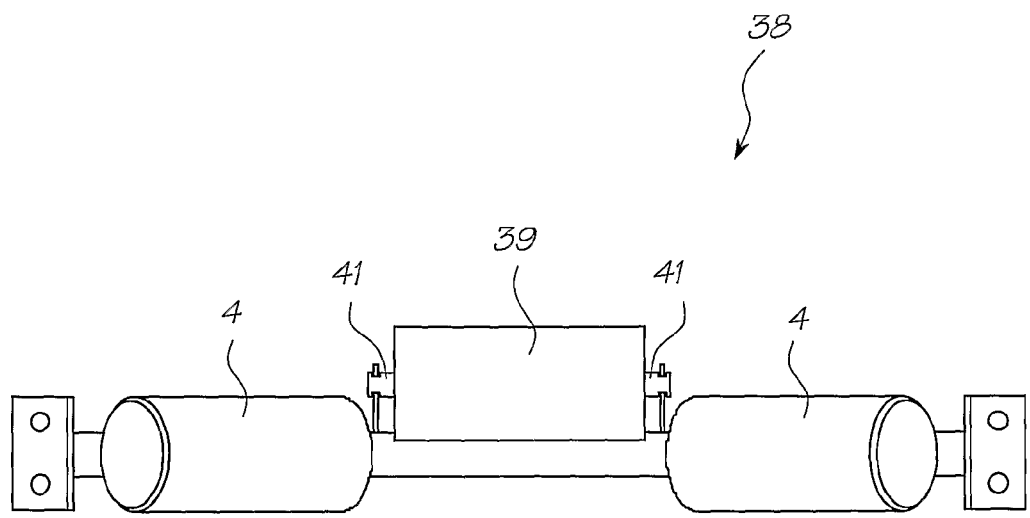
FIGS. 8a and 8b are front and side views, respectively, of a load idler roller set using a conventional through-shaft centre idler roller and two troughing idler rollers of FIGS. 2a and 2b.
Figure 8B:
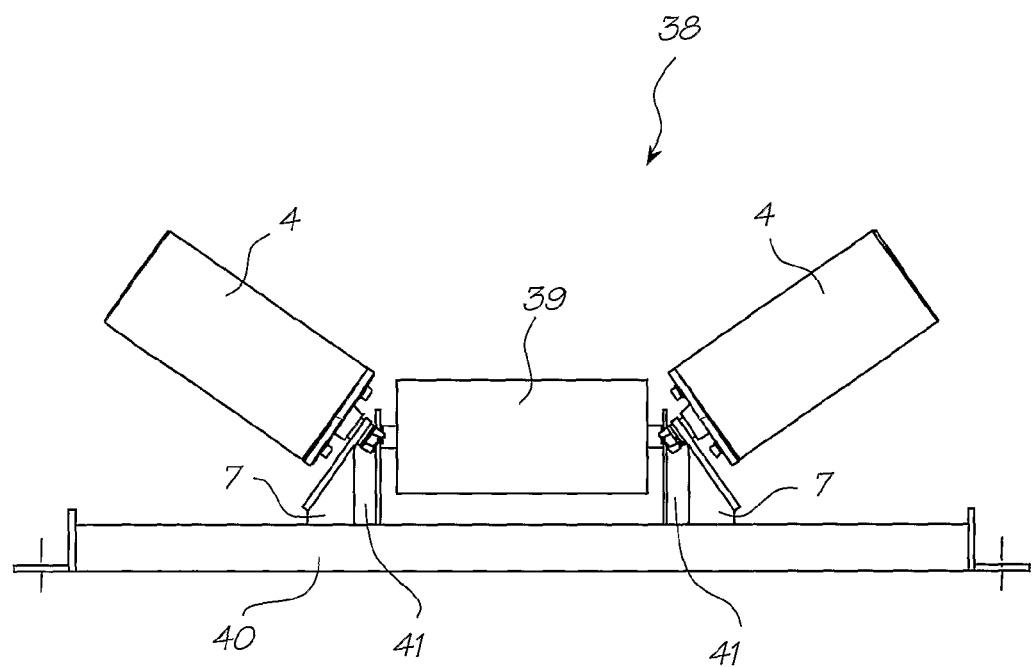

The idler rollers according to the various embodiments of the invention can be retrofitted to existing roller conveyors. As shown in FIGS. 8a and 8b, a pair of troughing idler rollers 4 is installed on a load idler set 38, with a conventional through-shaft type centre idler roller 39 fixed onto a base frame 40 by frame posts 41. Similarly in FIG. 9, a roller conveyor 42 is illustrated having the load idler set 38 of FIG. 8 and the return idler set 36 of FIG. 7. Several load idler sets 38 are mounted on the conveyor frame 43 at regular spaces between the drive and end pulleys of the endless belt 2 for transporting a bulk particulate material 3 along its length. Similarly, several return idler sets 36 are mounted below the roller conveyor frame 43 at regular spacings between the drive and end pulleys, to support the unloaded portion 2c of the endless belt 2.

Thus, the preferred embodiments of the invention provide an idler roller for a roller conveyor that is more resistant to bearing damage and contamination, is simpler in its construction and lighter in weight, thus having an increased service life. In the preferred embodiment, this is achieved by the support shaft being cantilevered to the idler frame by a preloaded tapered joint, as defined by the mutual engaging joining parts of the support shaft and the mounting frame. Consequently, the bending moment is transferred during operation onto the bearings directly, permitting the use of bearings with a low tolerance for angular error, but having a higher load capacity. This extends the life of the idler roller and enables higher rotational speeds of the idler roller to be used, and thus higher belt speeds in the roller conveyor.

Furthermore, this joint configuration enables the idler roller to be substantially lighter in mass, allowing the use of roller casings and support shafts having a larger diameter than the conventional through-shaft type roller, and thus reduces rubber indentation hysteretic losses. To further reduce the mass of the idler roller, the casing can be made from different materials to the bearing housing.

By being mounted in a cantilevered manner so that the seal faces downwardly or sideways, the bearing assembly and interior of the roller casing is protected from moisture or dust deposited by the bulk material transported by the conveyor, especially in the case of open conveyors where the idler rollers are particularly exposed to contaminants during operation. Unlike the through-shaft type idler roller which suffers from relatively large shaft deflections under load, the very small deflections of the stub shaft in the idler roller of the embodiments of the invention allow the use of a lip seal, reducing the complexity of the unit, although a labyrinth seal may be used, if desired.

The preferred embodiments of the invention, through the use of a cantilevered mounting, the preloaded tapered support shaft and its associated included angle of 10° to 30°, preferably 20°, provide a mounting system that greatly reduces the risk of injury during removal and replacement operations as the idler roller can be basically and safely removed without tampering with the endless belt or other parts of the conveyor, for servicing, re-casing, and renewal of the bearings, seal and lubricant grease.

A particular advantage of the embodiments of the invention is that since the preloaded, close coupled bearings are mounted on a short stub shaft at one end of the idler roller, this isolates the bearings from thermal expansion forces from the outer roller casing which is allowed to expand unhindered longitudinally, without directly loading the bearings.

A further advantage is that by being able to locate the bearings and support shaft at the cantilevered end, the idler roller can be used as troughing, wing centre or return idlers on the conveyor. The idler rollers are also readily adaptable for retrofitting onto existing roller conveyors.

Although the invention has been described with reference to specific examples it will be appreciated by those skilled in the art that the invention may be embodied in many other forms.

The invention claimed is:

1. An idler roller for supporting an endless belt in an open roller conveyor, said idler roller including:
   a frame for mounting the idler roller to the conveyor;
   a support shaft mountable to the frame for supporting the idler roller; and
   a roller casing having a free end and a mounted end, the roller casing rotatably mountable to the shaft at said mounted end by a bearing assembly, the bearing assembly being positioned proximate the mounted end and substantially enclosed within the roller casing,
   wherein the idler roller is cantilevered to the conveyor such that the bearing assembly is able to be designed to be positioned within the roller casing so that the load from a material on the conveyor corresponds to the approximate position of the bearing assembly, minimising the bending moment from the load on the bearing assembly wherein the idler roller extends from the frame upwardly such that the bearing assembly is at a lower elevation relative to the free end.

2. The idler roller of claim 1, wherein the roller casing has a distal end and a proximal end, the roller casing being removably mountable to the shaft without access to the bearing assembly from said distal end.

3. The idler roller of claim 1, further including a joint for cantilevering the support shaft to the frame, wherein the joint is defined by mutually engaging joining parts of the support shaft and the frame, the mutually engaging joining parts preferably having complementary shapes for mutual engagement.

4. The idler roller of claim 3, wherein one mutually engaging joining part includes a tapered bore and the other mutually engaging joining part includes a tapered head.

5. The idler roller of claim 4, wherein the tapered bore defines an included angle between 10° and 30°.

6. The idler roller of claim 4, wherein the tapered bore is formed at one end of the support shaft and the tapered head is formed on the frame.

7. The idler roller of claim 6, wherein the tapered bore is in the form of a blind bore, the blind bore including a recessed portion for receiving a fastener.

8. The idler roller of claim 6, wherein the tapered head is in the form of a collar for receiving a fastener therethrough and at least partial nestable engagement in the tapered bore.

9. The idler roller of claim 4, wherein the tapered bore is formed in the frame and the tapered head is formed on the support shaft.

10. The idler roller of claim 9, wherein the tapered head includes a projecting plug for fastening the tapered head to the tapered bore.

11. The idler roller of claim 10, wherein the projecting plug includes a screw thread and the recessed portion of the tapered bore includes a corresponding mating thread.

12. The idler roller of claim 1, wherein the bearing assembly and the support shaft are located towards the proximal end of the roller casing.

13. The idler roller of claim 1, wherein an end of the bearing housing adjacent the support shaft includes a seal for inhibiting the ingress of contaminants.

14. The idler roller of claim 1, wherein the idler roller is configured as a troughing idler roller for supporting lateral edge portions of the endless belt, a centre idler roller for supporting a central longitudinal portion of the endless belt, or a return idler roller for supporting an unloaded portion of the endless belt.

15. The idler roller of claim 14, wherein the idler roller is configured as a troughing idler roller cantilevered at an angle of between 20° and 45° with respect to the horizontal plane of the conveyor.

16. The idler roller of claim 14, wherein the idler roller is configured as a centre idler roller cantilevered at an angle of between 0° and 22.5° with respect to the horizontal plane of the conveyor.

17. The idler roller of claim 5, wherein the tapered bore defines an included angle of around 20°.

18. The idler roller of claim 4, wherein the tapered bore and tapered head are frusto-conical in shape.

19. The idler roller of claim 1, wherein the idler roller extends from the idler frame upwardly relative to the roller conveyer.

20. An idler roller for supporting an endless belt in a roller conveyor, said idler roller including:
 a frame for mounting the idler roller to the conveyor;
 a support shaft mountable to the frame for supporting the idler roller; and
 a roller casing having a free end and a mounted end, the roller casing rotatably mountable to the shaft at said mounted end by a bearing assembly, the bearing assembly being positioned proximate the mounted end and substantially enclosed within the roller casing,
 wherein the idler roller is cantilevered to the conveyor such that the bearing assembly is positioned within the roller casing and positioned at least partially beneath the belt so that the load from a material on the conveyor corresponds to the approximate position of the bearing assembly, minimising the bending moment from the load on the bearing assembly wherein the idler roller extends from the frame upwardly such that the bearing assembly is at a lower elevation relative to the free end.

21. The idler roller of claim 20 wherein the bearing assembly is positioned entirely beneath the belt.

\* \* \* \* \*